May 6, 1924.

W. B. TRACY 1,492,907

TICKET DELIVERY APPARATUS

Filed April 5, 1919    5 Sheets-Sheet 1

May 6, 1924.
W. B. TRACY
1,492,907
TICKET DELIVERY APPARATUS
Filed April 5, 1919   5 Sheets-Sheet 2
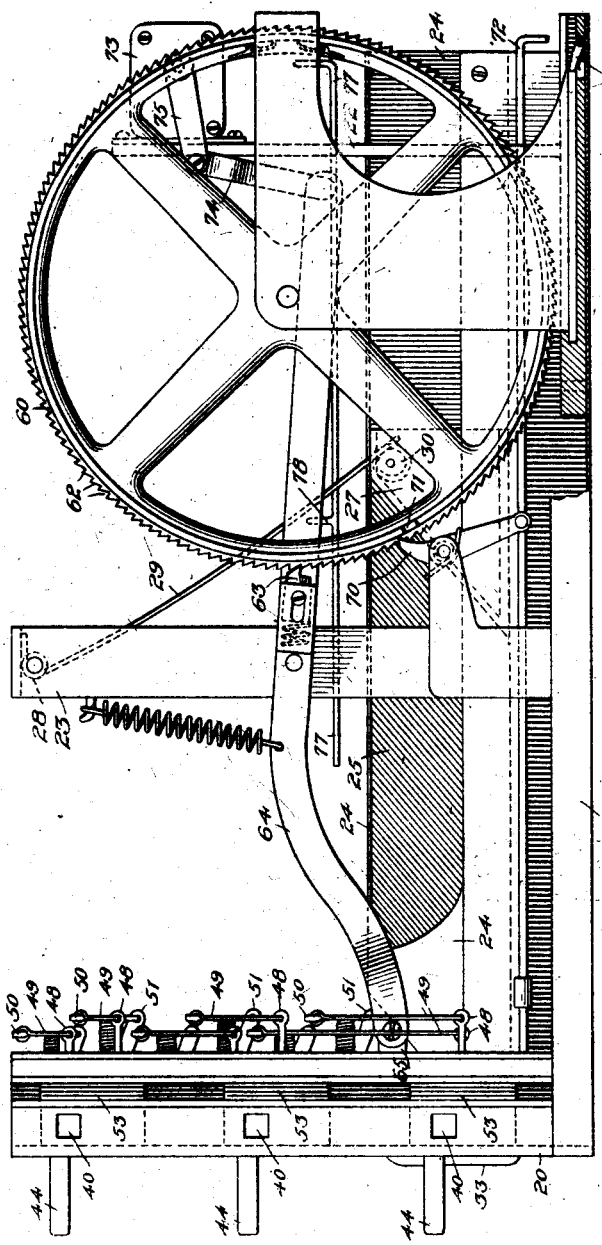
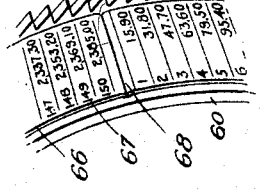
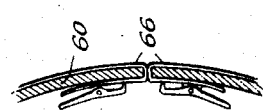
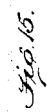
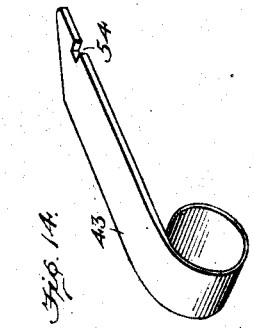
Inventor
Walter B. Tracy,
Witness
Edwin L. Bradford
By
Attorneys May 6, 1924.
W. B. TRACY
TICKET DELIVERY APPARATUS
Filed April 5, 1919   5 Sheets-Sheet 3
1,492,907
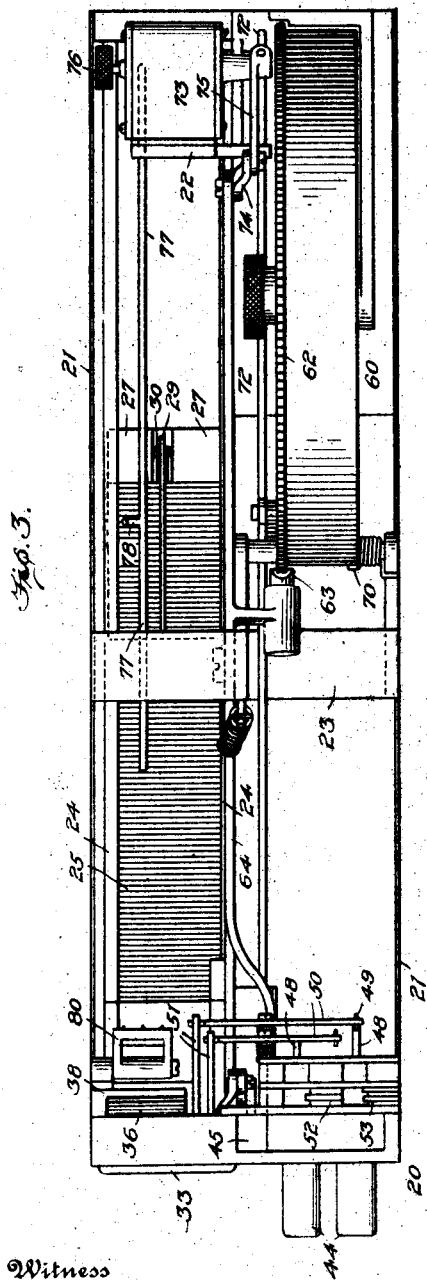
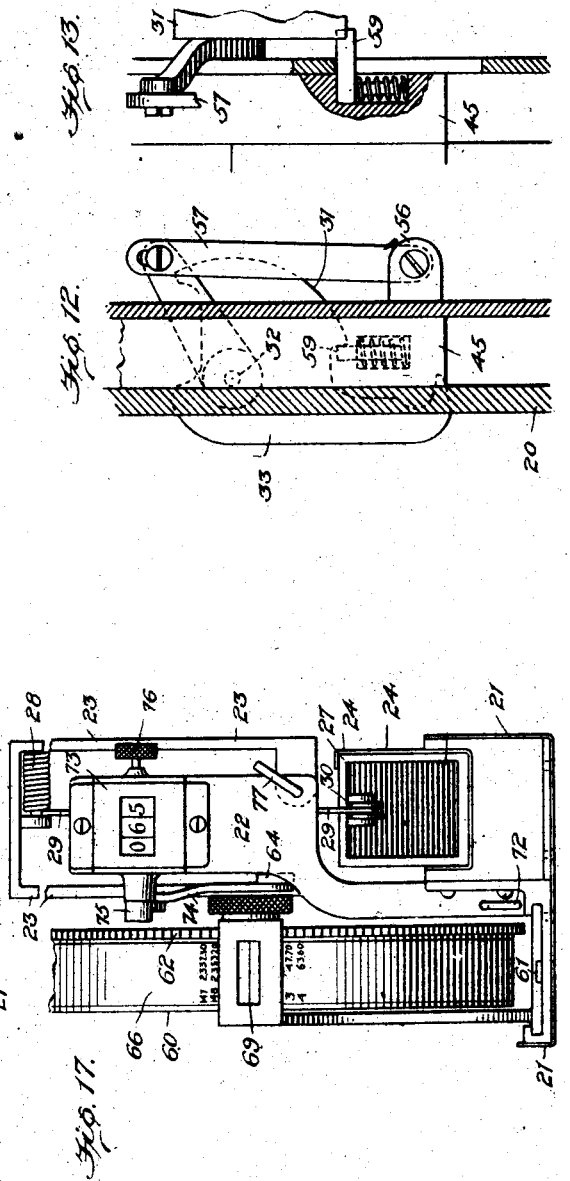

May 6, 1924.

W. B. TRACY

TICKET DELIVERY APPARATUS

Filed April 5, 1919  5 Sheets-Sheet 4

1,492,907

Witness
Edwin L. Bradford

Inventor
Walter B. Tracy
By
Greene & Irvine
Attorneys

May 6, 1924.
W. B. TRACY
TICKET DELIVERY APPARATUS
Filed April 5, 1919  5 Sheets-Sheet 5
1,492,907
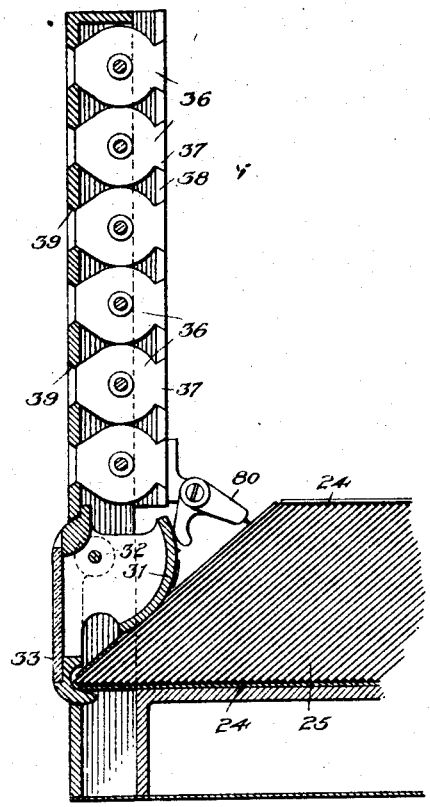
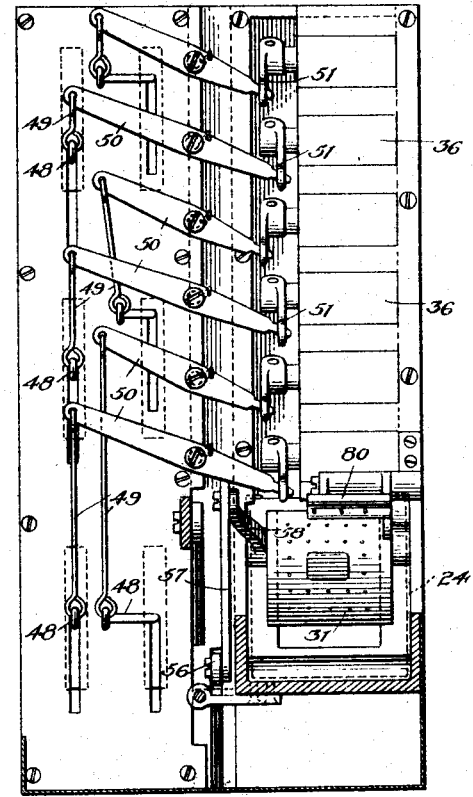
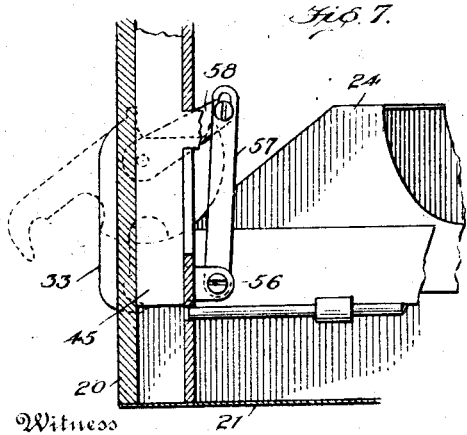
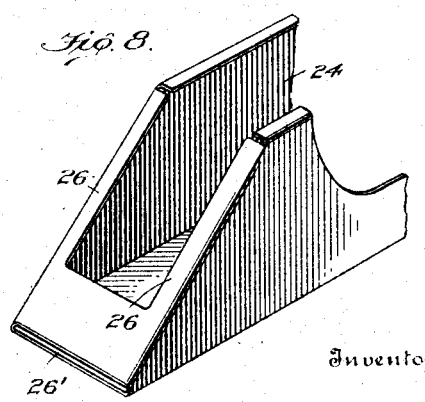

Patented May 6, 1924.

1,492,907

UNITED STATES PATENT OFFICE.

WALTER B. TRACY, OF MEMPHIS, TENNESSEE, ASSIGNOR OF ONE-FOURTH TO THOMAS J. FOX, OF MEMPHIS, TENNESSEE, AND ONE-TENTH TO THEODORE P. TRACY, OF ST. LOUIS, MISSOURI.

TICKET-DELIVERY APPARATUS.

Application filed April 5, 1919. Serial No. 287,907.

*To all whom it may concern:*

Be it known that I, WALTER B. TRACY, a citizen of the United States, and resident of Memphis, in the county of Shelby and State of Tennessee, have invented certain new and useful Improvements in Ticket-Delivery Apparatus, of which the following is a specification, reference being had therein to the accompanying drawing.

In ticket delivery machines it is desirable to have compact devices from which different persons each using his own key can withdraw tickets the value of which shall be added to a total on a register corresponding to and operated only through the use of that particular key, and which devices shall further register the grand total of values sold as well as the entire number of tickets sold. It is further desirable to have duplicate sets of devices that can be removably arranged in pigeonhole-like order, to have the devices secure against unauthorized withdrawal of tickets and that will be automatically locked against operating movement when the last ticket is withdrawn.

With these general ideas in mind, I use the devices illustrated in the accompanying drawings, in which, Figure 1 is a front view of a portion of a bank or cabinet of registering devices in the relative positions of the common sets of pigeonholes.

Figure 2 is a side elevation of the machine, a casing being omitted.

Figure 3 is a plan view of the same devices.

Figure 6 is a sectional elevation showing the arrangement of the individual registers, the delivery device and one end of the ticket magazine.

Figure 7 is a view similar to the lower part of Figure 6 showing locking devices and a ticket being delivered.

Figure 8 is a perspective view of a portion of the trough-like ticket magazine.

Figure 9 is a vertical sectional elevation showing means for operating the individual registers.

Figures 12 and 13 are detail views illustrating means normally locking the delivery closure.

Figure 14 is a perspective view of one of the keys which acts by mere insertion without rotation.

Figure 15 is a fragmentary section of a large wheel showing grand totals.

Figure 16 is a perspective view of the same portion.

Figure 17 is a view looking toward the grand total wheel from the delivery side or end of the machine and showing a monthly total number register of tickets sold.

Figure 1:
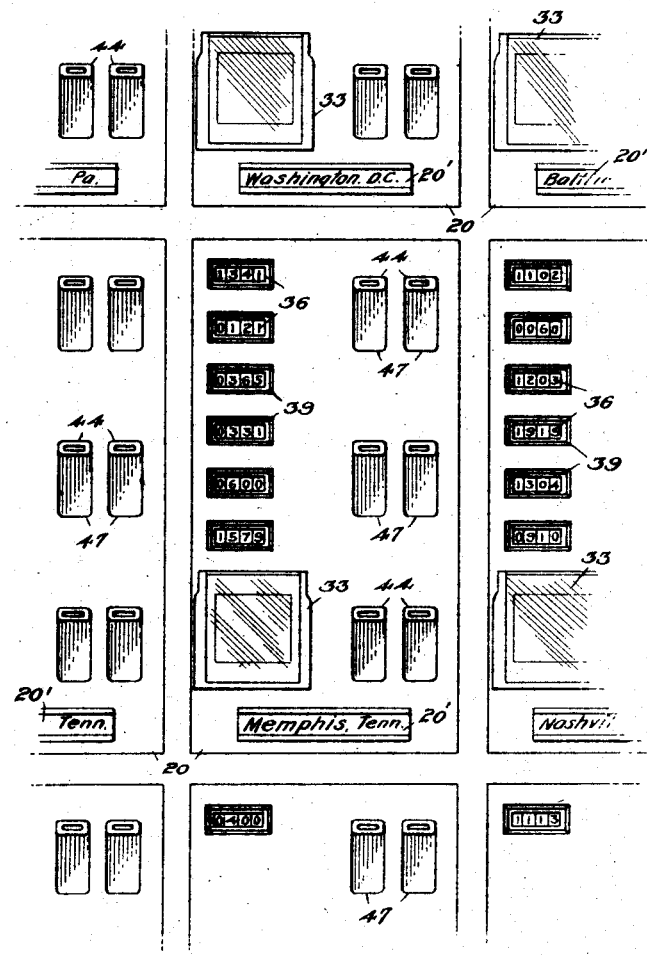
Figure 4:
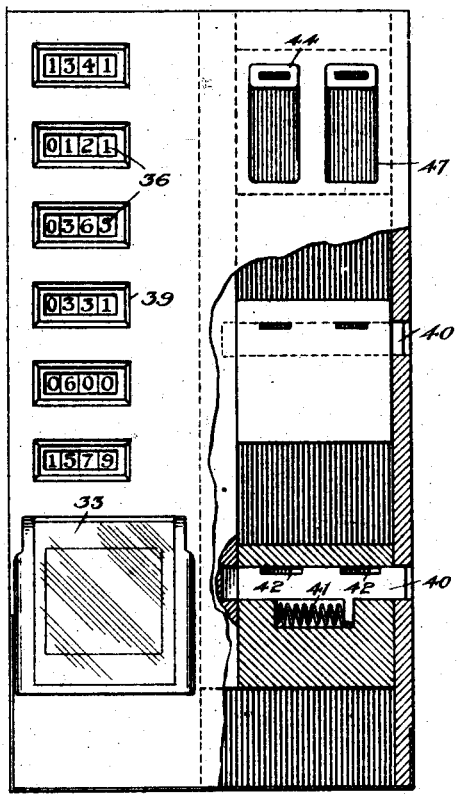
Figure 4 is a front view with parts broken away.
Figure 5:
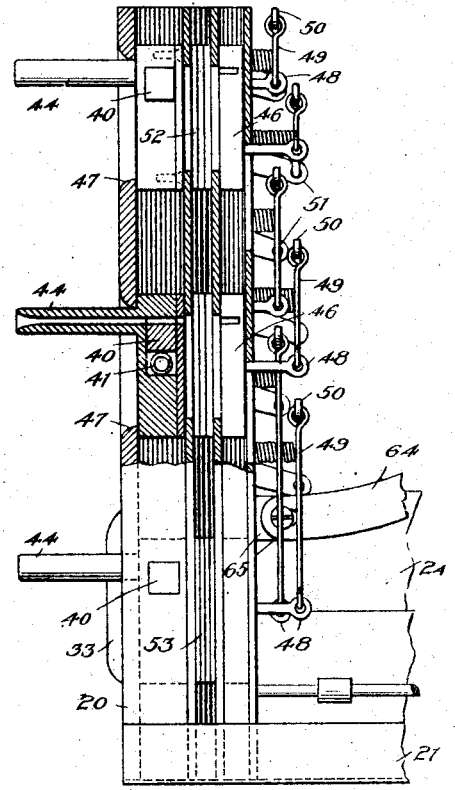
Figure 5 is a side elevation partly in section showing the devices seen in Figure 4.
Figure 10:
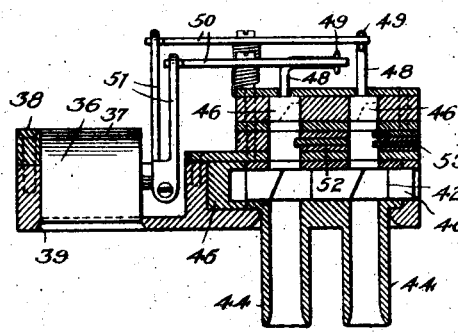
Figure 10 is a section on the line 10—10, Figure 4.

In these views, 20 represents a suitable base, which may bear a removable card 20' designating a railway station, 21 a light casing for the working parts, and 22, 23 upright portions of a frame rigidly secured to the base. In the base is a straight channel or way for a thin metal, ticket magazine 24 which when filled slides into place and is locked against retraction in any convenient way. In this magazine are placed many closely packed inclined tickets 25 (Figure 2) which are pressed forward against inclined lips 26 of the magazine by a block 27 having a correspondingly inclined face to rest against the rear of the mass of tickets, and urged forward by a coiled spring 28 mounted on the middle frame member 23 and having a long arm 29 which presses a small roller 30 (Figure 2) on the block 27. From the mass of tickets, in the machine illustrated one hundred and fifty in number, tickets are to be drawn singly and registered as above stated. The tickets are delivered singly by a rocking segment 31 pivoted at 32, bearing on the central part of the foremost ticket, and provided with a door or closure 33 (Figures 6, 7) which, as will appear, is locked except when a ticket is to be withdrawn. Above this delivery segment are removably mounted one above another six small individual registers 36 having projections 37 of dovetail form which slide into corresponding ways in a tubular frame 38 which is cut away at 39 to expose a registry number at the front of the machine, as seen at the left in Figure 4. These registers have in themselves no novelty.

Figure 11:
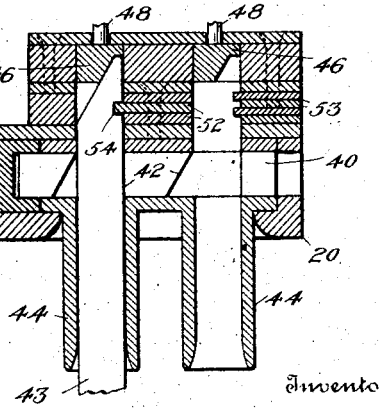
Figure 11 is a similar view on a larger scale showing the devices with a key inserted.

Alongside this vertical set of registers and in the same or a rigidly connected frame are mounted three locks each having a bolt 40 which is normally held projecting into an aperture in the frame 38 by a spring 41 and which has in its side two key-ways 42 for wedge pointed keys 43 (Figures 11 and 14) which, as either is shoved into the lock through projecting keyways 44, enter the ways 42 and force the bolt to the left, disengage it from the frame and engage it with a vertical bar 45. When pushed home, any key 43 engages a vertically sliding block 46. The lock being now disengaged from the frame 38 and engaged, by its bolt 40, with the vertically sliding bar 45 may itself slide bodily downward, the casing being cut away at 47 (Figure 4) to permit this movement. Each block 46 has a projection 48 pivotally connected by a link 49 to one end of a centrally pivoted lever 50 which engages an operating crank-like arm 51 of the corresponding register 36.

Each key 43 passes through a notch in one, two, three, etc., fixed plates 52, 53, &c., in its path, and each key has one, two or more notches 54 in its edge so placed that when the key is fully home the plate or plates lie in the corresponding notch or notches so that the key does not hinder the sliding of the lock if the proper key is used, although none of the other keys will thus free this lock. The use of this expedient does not, of course, bar the use of additional means for preventing the use of wrong keys.

Each lock, then, actuates only its own individual registering device, but every lock when moved down slides with it the bar 45. This bar at its lower end carries a lug 56 which is pivotally connected by a link 57 to an arm 58 of the shaft 32 (Figure 7) whereby, the door being unlocked, each descent of any lock rocks the segment 31, opens the door 33 and slides outward one ticket. The opening of the door when no lock is released is prevented by a lug 59 carried by the bar 45 and lying in the path of the segment 31, except when carried below that path by the descent of said bar (Figures 12, 13).

The grand total value register is a large wheel 60 mounted in a frame that slides into a way on the base and is removably secured therein by a spring pawl 61. The wheel has one hundred and fifty-one marginal notches 62 and is turned one notch on the return of the bar 45 after each descent by means of a spring pawl 63 carried at the end of a centrally pivoted bar 64, one opposite end of which is connected by a link 65 with the bar 45. The wheel carries a printed band 66 bearing marginal numbers at 67 corresponding with the several notches and opposite the first number "1" bears the value of a ticket for the station indicated on all the tickets in the mass 25, and double this value opposite "2", and so on, so that if at the outset a blank space 68 is shown at a window 69, (Figure 17) the withdrawal of the first ticket by operating any lock causes the number 1 and the value of one ticket to appear at this window.

When the tickets are exhausted, the last step of the wheel allows a pawl 70 to fall into a notch 71 preventing the wheel's further rotation. This pawl can be disengaged by a rod 72 running to the rear of the machine and terminating inside a locked cabinet enclosing the entire set of devices.

The cabinet being opened, the wheel can be, and magazine is, withdrawn, the latter is again filled with tickets and replaced. The wheel, if withdrawn, is also returned, but with the blank 68 at the window 69. The band 66 is changed only when rates are changed, or the machine is to be used for a different station. I prefer to carry the flanges 26 across the lower part of the magazine leaving an opening 26' (Figure 8) which will allow but one ticket to pass at a time.

The machine also includes a monthly total register 73 of the number of tickets sold, this register being without novelty, and operated by an extension of the bar 64 pivotally connected by a link 74 to the arm 75 of the register 73. This register is of the common type in which resetting at zero is accomplished at will by a thumb nut 76. In order that the spring arm 29 (Figure 2) may when desired be held up while the magazine is changed, a rotary rod 77 is provided, and when this is rotated an arm 78 swings down into position to bar the forward swinging of the spring arm.

If desired, as will often be the case, at the close of each day's business, the amount registered at the window 69 may be noted and the wheel may then be rotated, in the direction allowed by the spring pawl 63, until the blank 68 appears at the window, this rotation not affecting any other parts. This rotation of the wheel may be through contact of the fingers with its rear side, or resetting means like that used on the register 73.

I also prefer to add to this security by the use of a member 80 (Figure 6) which is normally held against swinging down upon the tickets 25 by the rocking member 31 but which swings down against the second ticket as soon as the first is partly withdrawn and by its eccentric grip holds the second ticket until 31 on its return releases it by rocking 80 upward.

Practically, each apparatus is complete in itself, and its dimensions are little greater than those used in the drawings, so that a great number of such units may be brought together in a very small space, or a space hardly longer than that occupied by a corresponding set of ordinary pigeonholes.

What I claim is:

1. The combination with a suitable casing base from which rises a frame provided with pigeonholes each forwardly closed and bearing the name of a specific station, all the pigeonholes containing similar delivering devices operable by inserting at different points suitable unlike keys and also containing individual registering devices each operable only through the use of the corresponding key, and a totalling register necessarily actuated when any key operates its individual register of any pigeonhole.

2. The combination with a ticket magazine adapted to support on edge a mass of closely adjacent tickets, of means for sliding the tickets singly out of the magazine, means for automatically registering the number and value of tickets so withdrawn, a wheel arranged to be rotated step by step through equal small angles as tickets are withdrawn in succession, and automatic means for locking the wheel and preventing operation of the apparatus after the completion of a predetermined number of steps.

3. The combination with a ticket seller's cabinet containing as many ticket-magazine receiving pigeonholes as there are kinds of tickets to be sold, of corresponding magazines for containing duplicate tickets, respectively, each magazine having a set of unlike locks identically similar to the locks of every other magazine, a register for each magazine corresponding to the different kinds of locks in the sets, and means whereby the use of a proper key in any of the like locks may actuate the corresponding register.

4. The combination with closely adjacent ticket magazines equal in number to the kinds of tickets to be sold and each provided with a relatively small number of different clerk's locks, each of the different locks being identical with one of the locks of every other magazine, and a register for each magazine and each kind of the different locks and operable only through the use of the key of a lock of that particular kind.

5. The combination with closely adjacent ticket magazines equal in number to the kinds of tickets to be sold and each provided with different clerk's locks each of which is identical with a lock of every other magazine, a register for each magazine and for each kind of clerk's locks and operable only through the use of the key of a lock of that kind, and a total register operatively connected with each of the registers first mentioned.

6. The combination with a forwardly closed frame adapted for insertion in a pigeonhole, of a ticket magazine in said frame and containing a file of closely adjacent tickets on edge, a series of normally locked individual ticket registers mounted in the frame, a series of locks having unlike keys and operably connected with said registers, respectively, a totalling register mounted in the frame and actuated by every registration of the individual registers, and means whereby in the act of registering the foremost ticket of said file is always ejected from the apparatus.

In testimony whereof I hereunto affix my signature.

WALTER B. TRACY.